United States Patent [19]

Tuller et al.

[11] 4,074,036

[45] Feb. 14, 1978

[54] PRODUCTION OF LOW MOLECULAR WEIGHT POLYANHYDRIDES

[75] Inventors: Harold W. Tuller, Long Valley; Ralph W. Nussbaum, West Orange, both of N.J.

[73] Assignee: Allied Chemical Corporation, Morris Township, N.J.

[21] Appl. No.: 739,215

[22] Filed: Nov. 5, 1976

[51] Int. Cl.² .................. C08F 4/12; C08F 212/06; C08F 220/08
[52] U.S. Cl. .................. 526/238; 260/47 UA; 260/837 R; 526/237; 526/272; 526/284; 526/292; 526/293; 526/296; 526/309; 526/317
[58] Field of Search ............... 526/237, 238, 272, 317

[56] References Cited

U.S. PATENT DOCUMENTS

| 3,732,332 | 5/1973 | Curtis et al. | 260/837 R |
| 3,789,038 | 1/1974 | Curtis et al. | 260/17.2 |
| 3,929,738 | 12/1975 | Curtis et al. | 526/272 |

*Primary Examiner*—Harry Wong, Jr.
*Attorney, Agent, or Firm*—Roger H. Criss; Henry E. Naylor; Jay P. Friedenson

[57] ABSTRACT

In a process for the production of a low molecular weight polyanhydride having a softening point within the range of about 111° to 156° C. by the mass polymerization reaction of a maleic monomer and at least one alkyl-substituted styrene at a temperature in the range of about 140° to 200° C., the improvement comprising employing an alkali metal bifluoride, preferably potassium bifluoride, as catalyst for the reaction.

15 Claims, No Drawings

PRODUCTION OF LOW MOLECULAR WEIGHT POLYANHYDRIDES

BACKGROUND OF THE INVENTION

1. Field of the Invention

This invention relates to the production of low molecular weight polyanhydrides by the mass polymerization of maleic monomers and alkyl styrenes.

2. Discussion of the Prior Art

The production of low molecular weight polyanhydrides from maleic monomers and alkyl styrenes is disclosed, for example, in U.S. Pat. Nos. 3,732,332 (1973), 3,789,038 (1974), and 3,929,738 (1975) to Curtis et al. For example, it has been proposed to produce such polyanhydrides by the polymerization, in the absence of a catalyst, of a maleic monomer and at least one alkyl-substituted styrene. More specifically, the above patents disclose the production of low molecular weight polyanhydrides having softening points within the range of about 111° to 156° C. by the mass polymerization reaction, in the absence of catalysts, of maleic anhydride and alpha-methyl styrene in a mol ratio of maleic monomer to alpha-methyl styrene of greater than 1:1, by heating at least a major portion of the maleic anhydride to a temperature of about 160° to 200° C., adding the alpha-methyl styrene to the maleic anhydride with agitation and continuing the polymerization until essentially all of the maleic anhydride and alpha-methyl styrene have polymerized. Such patents disclose that ctalysts, such as tertiary butyl perbenzoate, are not necessary or desirable.

The resultant polyanhydrides, such as the dianhydride of maleic anhydride and alpha-methyl styrene, are useful, for example, as hardeners for epoxy molding compounds. Prepolymers of such polyanhydrides with epoxy resins are also useful as hardeners for epoxy molding compounds.

However, it has been found that in the production of such polyanhydrides, a considerable amount of undesirable monomer and other materials is present in the polymerized mixture and since such materials have been found to interfere with the desired hardening reaction in epoxy molding compounds, in many cases the polyanhydrides must be vacuum stripped to remove such materials. As an example, in the production of such polyanhydrides, it is often necessary to vacuum strip the reaction products at a temperature in the range of about 160° to 200° C. under a vacuum of about 26 to 30 inches of mercury for about 2½ hours. As a result of such vacuum stripping, typically about 5 to 15 weight percent of monomeric and other undesirable materials are recovered from the polyanhydride.

It would be desirable if a process were provided by which a more effective conversion of the maleic monomer and alphamethyl styrene were effected such that the resultant product need not be subjected to vacuum stripping or, if the vacuum stripping is employed, under less severe conditions.

SUMMARY OF THE INVENTION

In accordance with this invention, it has been discovered that polyanhydrides of a maleic monomer and an alkylsubstitute styrene can be prepared utilizing an alkali metal bifluoride as catalyst. More particularly, in accordance with this invention, there is provided a process for the production of a low molecular weight polyanhydride having a softening point within the range of about 111° to 156° C., by the mass polymerization reaction of a maleic monomer and at least one vinyl monomer selected from the group consisting of styrene and alkyl-substituted styrenes at a temperature in the range of about 140° to 200° C., the improvement comprising employing as catalyst for such reaction an alkali metal bifluoride.

In one specific embodiment of this invention, the reactants are charged in a molar proportion of maleic monomer to styrene or alkyl-substituted styrene of greater than 1:1 and at least a major portion of the maleic monomer is heated to a temperature of about 140° to 200° C., with the styrene or alkyl-substituted styrene added to the maleic monomer with agitation and the polymerization reaction is continued until essentially all of the maleic monomer and styrene or alkyl-substituted styrene have polymerized.

In a preferred embodiment of this invention, polyanhydrides of maleic anhydride and alpha-methyl styrene are produced by polymerizing the reactants at a mol ratio of maleic anhydride to alpha-methyl styrene of greater than 1:1, utilizing potassium bifluoride as the catalyst.

DESCRIPTION OF THE PREFERRED EMBODIMENTS

The process of this invention is generally applicable to the copolymerization of alkyl-substituted styrenes including those containing additional substituents inert to the reaction, styrene and mixtures thereof. In general, such alkyl styrenes are of the formula:

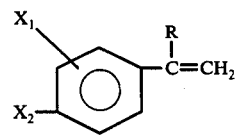

wherein R is hydrogen or alkyl containing 1 to 4 carbon atoms, with the proviso that when $X_1$ and $X_2$ are hydrogen, R is alkyl; $X_1$ and $X_2$ are independently hydrogen, halogen such as chloro, bromo, and iodo, alkoxy, alkyl and haloalkyl wherein the alkyl group contains from 1 to 4 carbon atoms, acetyl, monocyclic aryl such as phenyl, tolyl and xylyl, aralkyl such benzyl, phenethyl, etc., or $X_1$ and $X_2$ together with the benzene nucleus may form a fused ring. Such alkyl styrenes include alpha-methyl styrene, iosopropyl styrene, vinyl toluene, tertiary butyl styrene, vinyl xylene, 2,4-dimethyl styrene, 2-methyl-4-chlorostyrene, vinyl naphthalene, 2-methyl-4-benzyl styrene and mixtures thereof. Preferred alkyl-substituted styrenes are alpha-methyl styrene, tertiary butyl styrene, vinyl toluene and mixtures thereof.

The maleic compounds copolymerized with the above vinyl monomers are, in general, compounds which have one carboxyl group attached to each carbon atom of an olefinic group, i.e., wherein two carbon atoms are joined by a double bond. The remaining valences of each of the double bonded carbon atoms are generally satisfied by organic groupings or inorganic groupings which are essentially inert in the principal copolymerization reaction. Thus, the maleic compound will have only one olefinic linkage. Illustrative of such maleic compounds are materials defined by the following general formula

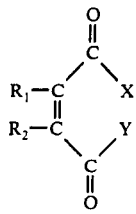

wherein $R_1$ and $R_2$ independently can be hydrogen, halogen such as chloro, bromo and iodo, aryl such as phenyl, xylyl, tolyl, etc., aralkyl such as benzyl, phenethyl, etc., or alkyl, the alkyl groups containing from 1 to 10 carbon atoms, or a cycloalkyl such as cyclopentyl, cyclohexyl, etc., X and Y independently can be OH, I, or X and Y together is O. Typical examples of such compounds include maleic anhydride, methyl maleic anhydride and materials which rearrange to maleic anhydrides during the reaction such as itaconic anhydride, propyl maleic anhydride, 1,2-diethyl maleic anhydride, phenyl maleic anhydride, cyclohexyl maleic anhydride, benzyl maleic anhydride, chloromaleic anhydride, and maleic acid. Especially preferred is maleic anhydride.

Although a wide variety of molar ratios may be employed herein, such as in the range of about 0.1 to 10:1 of either monomeric reactant, the maleic monomer and the vinyl monomer are preferably employed in molar ratios greater than 1.0 mol maleic monomer to 1.0 mol of vinyl monomer, preferably in the range of 1.1:1 to 2.5:1.

As catalysts for the present invention, there are employed the alkali metal bifluorides, such as potassium bifluoride and sodium bifluoride. Especially preferred is potassium bifluoride. The alkali metal bifluoride catalysts are employed in catalytically effective amounts. For example, the catalyst may be present in an amount of about 0.00005 to 1 weight percent, based upon the total reaction charge, and more preferably is present in an amount of 0.0001 to 0.01 weight percent and most preferably in the reaction of alpha-methyl styrene and maleic anhydride with potassium bifluoride catalyst, about 0.0005 to 0.001 weight percent.

Reaction temperatures are in the range of about 140° to 200° C., preferably about 150° to 180° C. Any conventional polymerization procedure may be employed to carry out the polymerization reaction of the present invention. However, it has been found desirable, especially in the polymerization reaction of maleic anhydride and alpha-methyl styrene, to charge a suitable reaction vessel with at least a major portion of the maleic monomer and catalyst, heat the maleic monomer to a temperature of about 140° to 200° C., add the alkyl-substituted styrene to the maleic monomer with agitation and carry out the polymerization at a temperature of about 140° to 200° C. until essentially all of the maleic monomer and alkyl-substituted styrene have polymerized. In such procedure, the remaining portion, if any, of the maleic monomer may be added after all of the alkyl-substituted styrene has been added. The latter procedure may be employed in order to keep the amount of free vinyl monomer in the product to a minimum. In general, it is not desirable to employ reverse addition, that is, to add the alkyl-substituted styrene monomer to the reactor followed by slow addition of the maleic monomer since the resultant product is a highly viscous copolymer of molecular weights outside of the desired range which are not suitable for use, for example, in epoxy molding compounds.

Typical polymerization reactants and procedures are disclosed in the aforementioned U.S. Pat. Nos. 3,732,332, 3,789,038 and 3,929,738, the disclosures of which are expressly incorporated herein.

The polyanhydrides of the present invention have softening points in the range of about 111° to 156° C. and preferably in the range of about 115° to 130° C. Such polyanhydrides have a number average molecular weight, as determined by vapor phase osmometry, of below about 1000, preferably within the range of about 200 to 950 and most preferably of about 300 to 450. The reaction product of the present process has been found to contain very minor amounts of materials other than the desired polyanhydride and as such need not be purified for utilizaton, for example, as hardeners for epoxy molding compounds without adverse effect on such compounds. Indeed, for example, it has been found that the polyanhydrides of maleic anhydride and alpha-methyl styrene produced in accordance with the process of this invention when employed as hardeners for epoxy molding compounds provide compounds with similar physical and other properties that are exhibited with epoxy molding compounds employing as hardeners the polyanhydrides produced by a non-catalytic process following which vacuum stripping has been conducted. This in indeed surprising since it is disclosed in the above-mentioned patents that when organic peroxide catalysts, such as tertiary butyl perbenzoate, are employed, the resulting polyanydrides do not exhibit the desired properties as hardeners for epoxy molding compounds. See Example 9 of such patents.

In accordance with this invention, it has been found that conventional molecular weight regulators are not necessary in the polymerization reaction. Such molecular weight regulators include mercaptans and chlorohydrocarbons such as chlorobenzene.

The following non-limiting examples are given to further illustrate the process of this invention. All parts and percentages are by weight unless otherwise indicated.

EXAMPLE 1—POLYANHYDRIDE PREPARATION

To a glass resin kettle fitted with a turbine agitator and under a nitrogen blanket were charged 1760 parts of maleic anhydride and 0.019 parts of potassium bifluoride (0.0007 weight percent of the total charge). The mixture was heated to 160° C. and there was slowly added over 4.5 hours a total of 1040 parts of alpha-methyl styrene. The mol ratio of maleic anhydride to alpha-methyl styrene charged was 2.03:1.0. The reaction temperature was 155° to 167° C. Following the last addition of alpha-methyl styrene, the mixture was held at the reaction temperature for an additional 25 minutes. The product was subjected to vacuum stripping at 165° C. and 28 inches of mercury until no more volatiles came over. The amount of material stripped was only 0.73 weight percent of the product. There was recovered a solid polymer having a Ring and Ball softening point of 122.5° C., a Gardner-Holt viscosity of T-U in a 40 percent polymer in tetrachloroethane (a solution viscosity of 840 centipoises) and an anhydride equivalent weight of 160.

The stripped product was subjected to liquid chromatographic separation and was analyzed by IR, NMR and mass spectroscopic analysis and was determined to contain 94.6 weight percent of the desired structure (structure A below) and 5.4 weight percent of an unidentified structure believed to be long chain high molecular weight polymer products.

Structure A

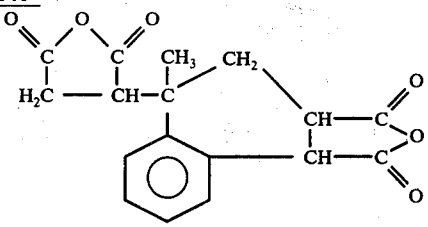

The results are shown in Table 1 below.

EXAMPLE 3-7 (COMPARATIVE)

Example 1 was repeated except that in Examples 3-7 no catalyst was employed. The results are also shown in Table 1.

As can be seen from the Table, the presence of minor amounts of potassium bifluoride as catalyst resulted in a polyanhydride in which only 0.73 and 2.6 percent could be stripped (Examples 1 and 2, respectively) by vacuum stripping. The reaction product contained a very high percentage of the desired polyanhydride structure with none of the indane product of alpha-methyl styrene being identified. In contradistinction, when the polymerization was carried out in the absence of a catalyst as suggested by the above-referenced patents, the amount of strippables increased to 7.74 to 14 percent (Examples 3-6). At a lower mol ratio of 1.70, the

TABLE 1

| | | | | Properties of Stripped Anhydride | | | | | | |
|---|---|---|---|---|---|---|---|---|---|---|
| Example | MA/AMS | Addition Time, Hrs (AMS) | Temp, °C. | Percent Stripped | Peak 1 | Peak 2 | Peak 3 | Softening Point °C. | Gardner Viscosity | Solution Viscosity, cps | Anhydride Equivalent Weight |
| 1 | 2.03/1.0 | 4.5 | 160 | 0.73 | 5.4 | 0 | 94.6 | 122.5 | T-U | 840 | 160 |
| 2 | 2.03/1.0 | 4.75 | 177 | 2.6 | 7.2 | 0 | 92.8 | 127 | U-U | 1050 | — |
| 3 | 2.03/1.0 | 5 | 160 | 10.2 | 8.2 | 3.4 | 88.4 | 123 | T-U | 840 | — |
| 4 | 2.03/1.0 | 9.25 | 160 | 14.0 | 5.8 | 2.2 | 92.0 | 123 | T-U | 840 | — |
| 5 | 2.03/1.0 | 4.75 | 180 | 7.75 | 4.8 | 1.6 | 93.6 | 120 | T | 798 | 160 |
| 6 | 2.03/1.0 | 5 | 163 | 8.7 | — | — | — | 123 | U-V | — | — |
| 7 | 1.70/1.0 | 5.25 | 160 | 4.3 | 10.1 | 5.5 | 84.4 | 122 | U-V | 1050 | 166 |

In Table 1, MA is maleic anhydride and AMS is alpha-methyl styrene. Peak 1 represents the unidentified long chain high molecular polymeric products which was equivalent to 25 cm on the chromatograph. Peak 2 represents an indane structure represented by structure B below and was equivalent to 46 cm and Peak 3 represents the desired structure A and was equivalent to 51 cm.

Structure B

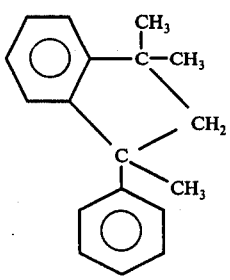

Liquid chromatographic analysis was performed using a Buchler polystaltic pump equipped with 8 inch PTFE tubing, a Glenco glass column measuring 0.9 × 100 cm and a Laboratory Data control refractive index detector. A strandard 1 mv strip chart recorder operating at a chart speed of 5 min/in. was used to record the signal. The column was packed with Sephadex LH-20 packing to a height of 96 cm. Tetrahydrofuran was used as the eluent, with 50 mg of the sample being dissolved in 0.5 cc of eluent.

The portion which was stripped off was analyzed and found to be predominantly maleic anhydride and the indane.

EXAMPLE 2

Example 1 was repeated except that the reaction temperature was 175°-179° C. and the reaction time was 4.75 hours. The results are also shown in Table 1.

amount of strippables was 4.3 percent (Example 7). In each case, the indane product of alpha-methyl styrene was identified. The product resulting from the process of this invention exhibited similar physical properties to those of the non-catalyzed product (cf, Examples 1 and 3).

EXAMPLE 8

Example 1 was repeated except that 0.009 percent of potassium bifluoride was employed as catalyst and the addition time was 4.75 hours. The product gelled before all of the alpha-methyl styrene was added. Hence, under the particular reaction conditions of this example, the amount of catalyst should be below 0.009 percent.

EXAMPLES 9-12 — EPOXY MOLDING COMPOUNDS

Epoxy molding compounds were prepared incorporating the polyanhydrides of Examples 1, 5, 6 and 7. In each case the vacuum stripped product was employed. The compounds were prepared by dry blending followed by densification on a hot differential roll and granulation. The formulation of Examples 9 and 10 was approximately 9% of the hardener, 14% o-cresol novolac epoxy, 2% brominated diglycidyl ether of bisphenol A, 73% filler, 1% lubricant, 0.2% accelerator, 0.25% pigment and 0.3% silane coupling agent. The formulation of Examples 11 and 12 was approximately 11% hardener, 16% o-cresol novolac epoxy, 70% slica filler, 0.5% lubricant, 2% fiber glass, 0.1% accelerator, 0.2% pigment and 0.2% silane coupling agent. The resulting molding compounds were evaluated for flow properties and the results are shown in Table 2 below.

TABLE 2

| | | EMMI Spiral Flow and Gel Times | | | |
|---|---|---|---|---|---|
| | | 300° F. | | 350° F. | |
| Ex. | Polyanhydride | In. | Sec. | In. | Sec. |
| 9 | Example 1 | 21.5 | 45 | 26.5 | 17.5 |
| 10 | Example 6 | 18.5 | 40 | 24 | 14.5 |

TABLE 2-continued

| | | EMMI Spiral Flow and Gel Times | | | |
|---|---|---|---|---|---|
| | | 300° F. | | 350° F. | |
| Ex. | Polyanhydride | In. | Sec. | In. | Sec. |
| 11 | Example 5 | — | — | 21 | 18 |
| 12 | Example 7 | — | — | 20 | 21 |

Table 2 demonstrates that the epoxy molding compounds hardened by the polyanhydride prepared in accordance with this invention exhibit similar molding properties to epoxy molding compounds hardened by the comparative polyanhydrides which were prepared without catalysts. Accordingly, it can be seen that this invention provides polyanhydrides of improved purity and conversion without adversely affecting their end use application.

EXAMPLES 13-15

An epoxy molding compound was prepared as in Example 11 utilizing a polyanhydride hardener prepared in the presence of potassium bifluoride and under the conditions of Example 1 except at a mol ratio of MA/AMS of 2.0/1.0 for 5.5 hour reaction time. The vacuum strippables amounted to 0.87 weight percent and the stripped product had a Ring and Ball softening point of 123° C., a Gardner-Hold viscosity of T-U and an anhydride equivalent weight of 160.

Test dics molded from the compounds were measured for their electrical properties (dielectric constant and dissipation factor) at 25° C. and after exposure to 15 psig steam for 16 hours. These properties were measured at 60 cycles using a General Radio 1621 capacitance bridge. The percent change of the dielectric constant (DK) times the dissipation factor (DF) after steam exposure times the multiple obtained at dry conditions was determined.

The liner coefficient of expansion (LCE) of molded parts was determined in the range of 50° to 200° C. utilizing a Perkin-Elmer Model TMS-1 Thermal Mechanial Analyzer.

The results are shown in Table 3 under Example 13. The properties of the molding compounds of Examples 11 and 12 are shown in Table 3 under Examples 14 and 15, respectively, for comparison.

TABLE 3

| | DK/DF | | | LCE (in/in/° C × 10⁻⁶) | | |
|---|---|---|---|---|---|---|
| Example | 25° C | Pressure Pot | % charge | 50–100° C | 100–150° C | 150–200° C |
| 13 | 4.38/.017 | 5.75/.113 | 795 | 26–28 | 28–31 | 31–44 |
| 14 | 4.39/.017 | 5.70/.113 | 763 | 28–29 | 29–39 | 39–46 |
| 15 | 4.41/.019 | 5.67/.112 | 670 | 26–28 | 28–33 | 33–46 |

As can be seen from Table 3, epoxy molding compositions hardened with the polyanhydrides prepared in accordance with this invention exhibit similar desirable wet electrical and thermal properties to those hardened with polyanhydrides prepared by a non-catalytic process.

EXAMPLES 16-19

Example 1 is repeated using styrene (Example 16), t-butyl styrene (Example 17), a mixture of t-butyl styrene and alpha-methyl styrene in a molar of 3:1 (Example 18) and vinyl toluene (Example 19) as the vinyl monomer in a molar ratio of maleic anhydride to alkyl-substituted styrene of 2.0:1. Similar results are noted.

EXAMPLES 20 and 21

Example 1 is repeated using propyl maleic anhydride (Example 20) and chloromaleic anhydride (Example 21) in a molar ratio of maleic monomer to alpha-methyl styrene of 2.25:1. Similar results are also noted.

EXAMPLE 22

Example 1 is repeated using sodium bifluoride as the catalyst. Similar results are noted.

The polyanhydrides of this invention, as mentioned above, are useful as hardeners for epoxy resins. Exemplary of such epoxy resins are the di- and polyglycidyl ethers of bisphenol A, brominated di- and polyglycidyl ethers of bisphenol A, epoxy novolacs and cycloaliphatic epoxies. In addition, prepolymers of the polyanhydrides and epoxy resins may be prepared and utilized as hardeners for epoxy molding compounds in a manner described in the aforementioned Curtis et al. patents.

It is to be understood that variations and modifications of the present invention may be made without departing from the scope of the invention. It is also to be understood that the scope of the invention is not to be interpreted or limited to the specific embodiment disclosed herein, but only in accordance with the appended claims when read in light of the foregoing disclosure.

We claim:

1. In a process for the production of a low molecular weight polyanhydride having a softening point within the range of 111° to 156° C., by the mass polymerization reaction of a maleic monomer and at least one vinyl monomer selected from the group consisting of styrene and alkyl-substituted styrenes at a temperature in the range of about 140° to 200° C., the improvement comprising employing an alkali metal bifluoride as catalyst for said reaction.

2. The process in accordance with claim 1 wherein said catalyst is potassium bifluoride.

3. The process in accordance with claim 2 wherein said potassium bifluoride is present in an amount of about 0.00005 to 1 percent by weight.

4. The process in accordance with claim 1 wherein said maleic monomer is selected from the group consisting of maleic acid, maleic anhydride, anhydrides which rearrange to maleic anhydrides and the halo-, aryl-, aralkyl-, or cycloalkylsubstituted derivatives thereof.

5. The process in accordance with claim 1 wherein said alkyl-substituted styrene is represented by the formula

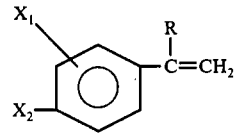

wherein R is hydrogen or alkyl of 1 to 4 carbon atoms with the proviso that where $X_1$ and $X_2$ are hydrogen, R is alkyl; $X_1$ and $X_2$ independently are hydrogen, halogen, alkoxy, alkyl and haloalkyl wherein the alkyl groups contain from 1 to 4 carbon atoms, acetyl, monocyclic aryl, aralkyl, or $X_1$ and $X_2$ together with the benzene nucleus form a fused ring.

6. The process in accordance with claim 1 wherein said vinyl monomer is a member selected from the group consisting of alpha-methyl styrene, vinyl toluene, tertiary butyl styrene and mixtures thereof.

7. The process in accordance with claim 6 wherein said maleic monomer is maleic anhydride.

8. The process in accordance with claim 7 wherein said maleic anhydride and said vinyl monomer are added to the reaction in a mol ratio of greater than 1:1.

9. The process of claim 8 wherein said vinyl monomer is alpha-methyl styrene and wherein said mol ratio of maleic anhydride to alpha-methyl styrene is in the range of about 1.1:1 to 2.5:1.

10. The process of claim 9 wherein said catalyst is potassium bifluoride which is present in an amount of about 0.00005 to 1 weight percent.

11. The process of claim 10 wherein at least a major portion of said maleic anhydride is heated to a temperature of about 160° to 200° C. in the presence of said catalyst, said alpha-methyl styrene is added to said maleic anhydride with agitation and said polymerization is continued until essentially all of the maleic anhydride and alpha-methyl styrene have polymerized.

12. The process of claim 11 wherein said potassium bifluoride is present in an amount of 0.0001 to 0.01 weight percent.

13. The process of claim 12 wherein said polyanhydride has a softening point in the range of 115° to 130° C.

14. The process of claim 1 wherein said polyanhydride has a number average molecular weight, as determined by vapor phase osmometry, of less than 1,000.

15. The process of claim 14 wherein said molecular weight is within the range of about 200 to 950.

* * * * *

UNITED STATES PATENT AND TRADEMARK OFFICE
CERTIFICATE OF CORRECTION

PATENT NO. : 4,074,036
DATED : February 14, 1978
INVENTOR(S) : Harold W. Tuller and Ralph W. Nussbaum It is certified that error appears in the above-identified patent and that said Letters Patent are hereby corrected as shown below:

Column 6, line 16, "7.74" should read -- 7.75 --.

Column 6, line 58, "slica" should read -- silica --.

Column 7, line 65, after "molar" insert -- proportional

Column 8, line 56, before "or" insert -- alkyl- --.

Signed and Sealed this

Thirtieth Day of May 1978

[SEAL]

Attest:

RUTH C. MASON
Attesting Officer

LUTRELLE F. PARKER
Acting Commissioner of Patents and Trademarks